(12) United States Patent
Kaltenhäuser

(10) Patent No.: US 10,183,810 B2
(45) Date of Patent: Jan. 22, 2019

(54) RADIO-FREQUENCY IDENTIFICATION ARRANGEMENT FOR A CHAIN CONVEYOR FOR PIECE GOODS AND CHAIN CONVEYOR HAVING SUCH A RADIO-FREQUENCY IDENTIFICATION ARRANGEMENT

(71) Applicant: FlexLink AB, Göteborg (SE)

(72) Inventor: Peter Kaltenhäuser, Egelsbach (DE)

(73) Assignee: FlexLink AB, Göteborg (SE)

( * ) Notice: Subject to any disclaimer, the term of this patent is extended or adjusted under 35 U.S.C. 154(b) by 0 days.

(21) Appl. No.: 15/527,603

(22) PCT Filed: Nov. 18, 2015

(86) PCT No.: PCT/EP2015/076961
§ 371 (c)(1),
(2) Date: May 17, 2017

(87) PCT Pub. No.: WO2016/079178
PCT Pub. Date: May 26, 2016

(65) Prior Publication Data
US 2017/0362035 A1    Dec. 21, 2017

(30) Foreign Application Priority Data

Nov. 18, 2014 (DE) .................... 20 2014 009 109 U
Nov. 24, 2014 (DE) .................... 20 2014 105 645 U

(51) Int. Cl.
*B65G 21/20*    (2006.01)
*B65G 43/08*    (2006.01)
*B65G 21/22*    (2006.01)

(52) U.S. Cl.
CPC ............. *B65G 21/20* (2013.01); *B65G 21/22* (2013.01); *B65G 43/08* (2013.01);
(Continued)

(58) Field of Classification Search
CPC .... B65G 21/20; B65G 21/22; B65G 21/2045; B65G 43/08; B65H 2553/52
(Continued)

(56) References Cited

U.S. PATENT DOCUMENTS 6,107,921 A * 8/2000 Eberhardt ............ G06K 7/0008
                                                    340/572.1
6,236,316 B1 * 5/2001 Eberhardt ............ G06K 7/0008
                                                    340/572.7
(Continued)

FOREIGN PATENT DOCUMENTS

CH        699992 B1    9/2012
DE     10236559 A1    2/2004
(Continued)

OTHER PUBLICATIONS

"FlexLink Conveyor system X45", FlexLink-English and German, (2014), 99 pgs.
(Continued)

*Primary Examiner* — Leslie A Nicholson, III
(74) *Attorney, Agent, or Firm* — Schwegman Lundberg & Woessner, P.A.

(57) ABSTRACT

A radio-frequency identification arrangement for a chain conveyor for piece goods having a driven linked chain is disclosed, comprising a support rail element 3 for guiding and supporting the linked chain 4 in the region of the radio-frequency identification arrangement and a radio-frequency reading device or radio-frequency writing/reading device 10 for performing contactless reading or reading/writing of information by means of a radio-frequency signal. According to the invention, the radio-frequency reading device or radio-frequency writing/reading device 10 is disposed directly on a bottom 30 of the support rail element 3 and facing an underside of the linked chain 4. For this
(Continued)

purpose, the latter may be accommodated in a recess or cavity of the support rail element 3.

By means of the radio-frequency identification arrangement, an RFID tag, which is mounted on a workpiece or workpiece carrier, can be read or read and written to through the linked chain of the chain conveyor. Furthermore, a relatively short distance between the radio-frequency reading device or radio-frequency writing/reading device and the RFID tag may be accomplished and thus an advantageously low power of the radio-frequency signal used for identification.

18 Claims, 7 Drawing Sheets

(52) U.S. Cl.
CPC .... *B65G 21/2045* (2013.01); *B65G 2203/046* (2013.01); *B65H 2553/52* (2013.01)

(58) Field of Classification Search
USPC ............... 198/465.1, 465.2, 502.1, 837, 841
See application file for complete search history.

(56) References Cited

U.S. PATENT DOCUMENTS

| | | | |
|---|---|---|---|
| 8,739,964 B2* | 6/2014 | Ek | B65G 47/53 198/465.2 |
| 9,483,672 B2* | 11/2016 | Pantaloni | G06K 7/10178 |
| 2007/0272519 A1 | 11/2007 | Swoboda | |
| 2010/0222920 A1* | 9/2010 | Andreoli | B65G 43/02 700/230 |

FOREIGN PATENT DOCUMENTS

| | | |
|---|---|---|
| DE | 20221641 U1 | 9/2006 |
| DE | 202010017525 U1 | 1/2012 |
| EP | 2070647 A1 | 6/2009 |
| EP | 2135823 A1 | 12/2009 |
| WO | WO-2000041148 A1 | 7/2000 |
| WO | WO-2009047282 A1 | 4/2009 |

OTHER PUBLICATIONS

"International Application No. PCT/EP2015/076961, International Search Report dated Feb. 2, 2016", w/ English Translation, (dated Feb. 2, 2016), 10 pgs.

"International Application No. PCT/EP2015/076961, Written Opinion dated Feb. 2, 2016", (dated Feb. 2, 2016), 8 pgs.

"RFID in the Body Shop", Turck (Tianjin) Industrial Engineering Co., Ltd. Applications_RFID, (2014), 18-19.

"German Application Serial No. 20 2014 105 645.9 , Examination Report dated Aug. 11, 2015", (dated Aug. 11, 2015), 5 pgs.

\* cited by examiner

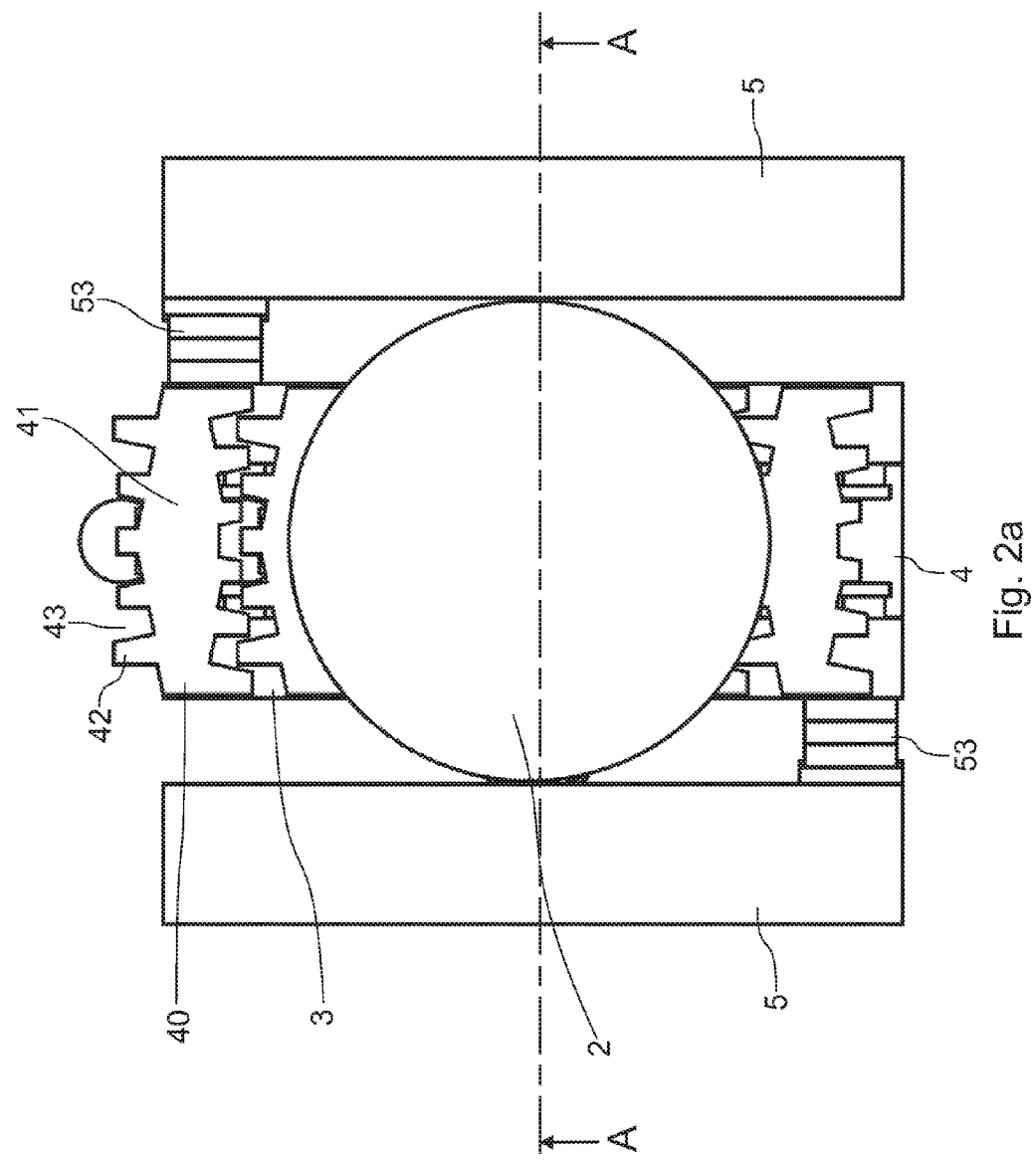

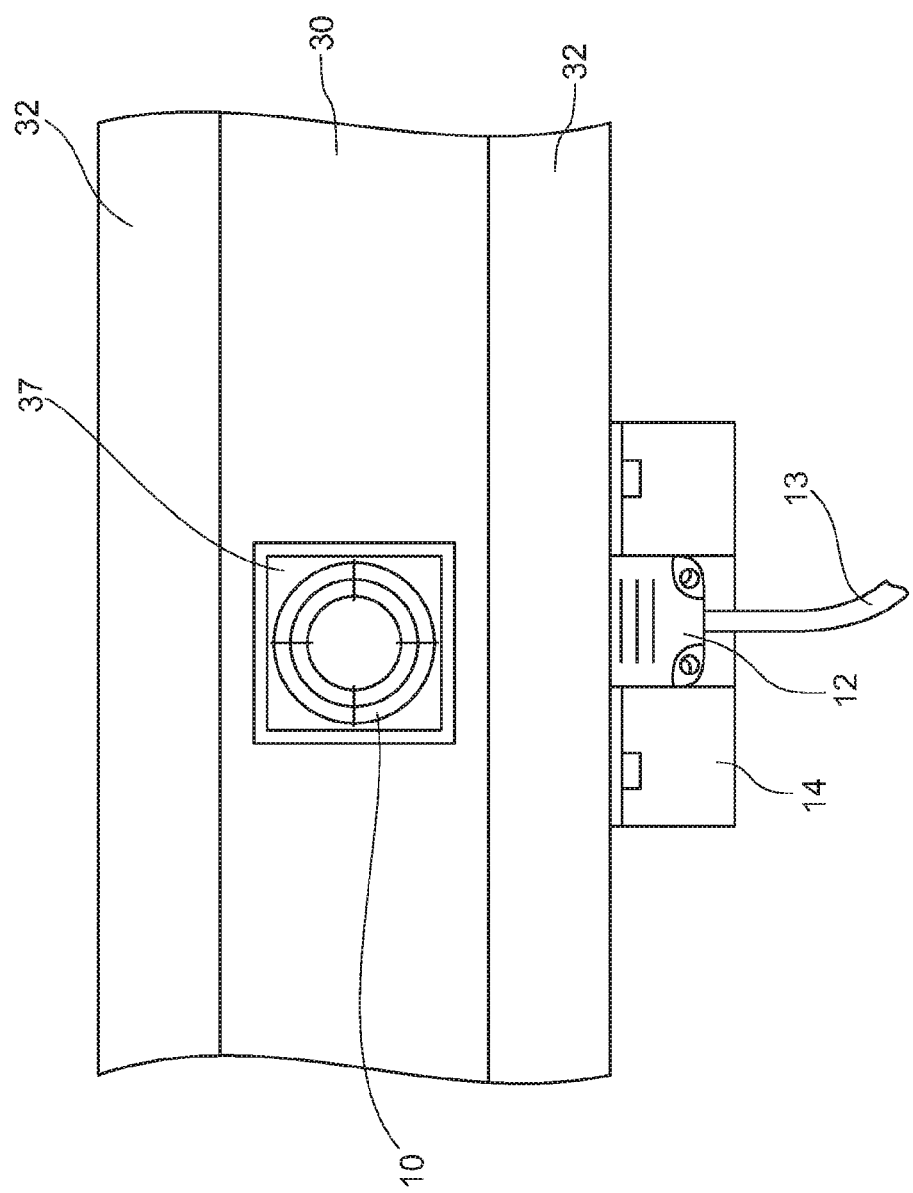

RADIO-FREQUENCY IDENTIFICATION ARRANGEMENT FOR A CHAIN CONVEYOR FOR PIECE GOODS AND CHAIN CONVEYOR HAVING SUCH A RADIO-FREQUENCY IDENTIFICATION ARRANGEMENT

The present application is a U.S. National Stage Filing under 35 U.S.C. 371 from International Application No. PCT/EP2015/076961, filed on 18 Nov. 2015, and published as WO2016/079178 on 26 May 2016, which claims the priority of German utility model No. 20 2014 009 109, 'radio-frequency identification arrangement for a chain conveyor for piece goods and chain conveyor having such a radio-frequency identification arrangement', filed on Nov. 18, 2014 and of German Utility Model No. 20 2014 105 645, 'radio-frequency identification arrangement for a chain conveyor for piece goods and chain conveyor having such a radio-frequency identification arrangement', filed on Nov. 24, 2014, which applications and publication are incorporated herein by reference in their entirety.

FIELD OF INVENTION

The present invention relates generally to the identification of workpieces or workpiece carriers, which are conveyed by a chain conveyor, and relates in particular to a radio-frequency identification arrangement for a chain conveyor for piece goods and to a chain conveyor comprising at least one such radio-frequency identification arrangement.

BACKGROUND OF INVENTION

FIG. 1 shows, in a schematic top view, a detail of a chain conveyor comprising a radio-frequency identification arrangement according to the prior art.

The chain conveyor comprises a linked chain 104, which may be endlessly circulating, for example. The linked chain 104 is formed by a plurality of link members each having a plurality of teeth 104 and gaps 104b formed therebetween and each extending along an arcuate front and rear face side, so that the linked chain 104 can be deflected horizontally. The linked chain 104 is guided by two lateral support rails 103. A workpiece carrier 102 is supported on the linked chain 104 such that the two flattened side surfaces 102a of the workpiece carrier 102 are aligned parallel to the lateral guidings 105. An RFID tag is disposed at one of the two flattened side surfaces 102a of the workpiece carrier 102 and can be read out or read out and written by the RFID reading/writing device 112 for identifying the workpiece (not shown) which is arranged on the workpiece carrier 102 (not shown).

This arrangement requires an oriented feed of the workpiece carrier 102, which results in higher costs and more effort for the orientation of the workpiece carrier 102, but also limits the flexibility in conveying piece goods in such chain conveyors. In particular, such an arrangement requires an asymmetrical arrangement of the RFID tag and an exact adjustment of the chain conveyor so that the workpiece carriers can be advanced past at a small distance between the RFID tag and the RFID reading/writing device. If the workpiece carriers are not designed asymmetrically, in particular in the form of rotationally symmetrical workpiece carriers (so-called pucks), the workpiece carriers need to be guided out of the chain conveyor in order to be read or read and written with data, which increases costs and limits the flexibility further.

DE 202010017525 U1 discloses an arrangement device for holding a puck in an arrangement position in a conveyor system comprising a base portion, a rail portion and a rotary disc which is rotatably supported in the base portion and has a puck recess. Furthermore, an RFID reading/writing unit is provided at a control rail of the rail portion. However, it is not disposed facing the underside of the linked chain, so that higher radio-frequency powers are required for identification.

CH 699 992 B1 discloses a conveyor belt module, the details of which are described in EP 2070647 B1, but which does not comprise a support rail element in the sense of the present application.

Against this background, there is a further need for improvements in chain conveyors of the aforementioned type.

SUMMARY OF THE INVENTION

It is an object of the present invention to provide an enhanced radio-frequency identification arrangement for a chain conveyor for piece goods as well as an improved chain conveyor comprising at least one such radio-frequency identification arrangement, whereby in particular a simpler and more cost-effective conveying of piece goods and a reliable identification of the piece goods can be accomplished.

These problems are solved by a radio-frequency identification arrangement as claimed by claim 1 and by a chain conveyor for piece goods as claimed by claim 7. Further advantageous embodiments are the subject-matter of the dependent claims.

According to a first aspect of the present invention, there is provided a radio-frequency identification arrangement for a chain conveyor for piece goods having a driven linked chain, in particular a linked chain made of a plastic material, comprising a support rail element for guiding and supporting the linked chain in the region of the radio-frequency identification arrangement and a radio-frequency reading device or radio-frequency writing/reading device for the non-contact reading or reading/writing of information by means of a radio-frequency signal. According to the present invention, the radio-frequency reading device or radio-frequency writing/reading device is disposed directly on a bottom of the support rail element and faces an underside of the linked chain. In particular, the radio-frequency reading device or radio-frequency writing/reading device can be arranged directly at a bottom of the support rail element and can face an underside of the linked chain. Particularly, the radio-frequency reading device or radio-frequency writing/reading device may be disposed directly on or inside the bottom of the support rail element, preferably at a central position on or inside the bottom of the support rail element.

A radio-frequency identification arrangement configured in this way can be easily integrated into a chain conveyor for piece goods of the aforementioned type, wherein the support rail element of the above-mentioned radio-frequency identification arrangement is then suitably connected to the support rails of the chain conveyor. By means of the radio-frequency identification arrangement according to the present invention, an RFID tag, which may be attached to the workpiece or to a workpiece carrier, can be read or read and written with data through the linked chain of the chain conveyor. In particular, thus also a relatively small distance between the radio-frequency reading device or radio-frequency writing/reading device and the RFID tag can be implemented, and thus an advantageously low power of the radio-frequency signal used for the identification can be accomplished. According to the present invention, no additional orientation of the piece goods or workpiece or workpiece carrier on the linked chain is necessary, which results in lower costs and increased flexibility in the conveyance of piece goods. In particular, according to the present invention, also rotationally symmetrical workpiece carriers or workpieces, if viewed in a plan view, (for example in the form of so-called 'pucks') can be reliably conveyed and identified.

Here, the radio-frequency reading device or radio-frequency writing/reading device is, of course, disposed on or inside the bottom of the support rail element in such a way that it does not protrude into the movement path of the linked chain so that a contact between the radio-frequency reading device or radio-frequency writing/reading device and the underside of the linked chain or the chain links of the linked chain can be reliably excluded.

According to a further embodiment, an opening is formed in the bottom of the support rail element, through which the radio-frequency signal is emitted by the radio-frequency reading device or radio-frequency writing/reading device directly to the underside of the linked chain and/or is received therefrom. It is advantageous that the radio-frequency radiation used for identification can reach the RFID tag even more unhindered, which is particularly advantageous if the support rail element is made by an electrically conductive metal, in particular embodied as a continuous casting profile or as an extruded endless profile. In order to prevent the deposition of dust etc. on the surface of the radio-frequency reading device or radio-frequency writing/reading device, the opening of the support rail element may also be covered by a cover transparent to the radio-frequency radiation, in particular by a plastic film. The opening in the bottom of the support rail element can thereby merge in a recess or a cavity on the inner side of the support rail element in order to accommodate therein the radio-frequency reading device or radio-frequency writing/reading device at least partially and preferably completely so that the radio-frequency reading device or radio-frequency reading/writing device may protrude only slightly beyond the bottom of the support rail element and preferably does not project at all beyond it.

In particular, if the radio-frequency reading device or radio-frequency writing/reading device is formed corresponding to the base area of the support rail element, a predetermined orientation of the radio-frequency reading device or radio-frequency writing/reading device can also be accomplished visually and in a simple manner when mounting the radio-frequency reading device or radio-frequency writing/reading device at the rail support element.

According to a further embodiment, the support rail element is formed as an endless profile and with an upper and lower space, an inner cavity being formed between the bottom of the upper and lower space, in which the radio-frequency reading device or radio-frequency writing/reading device is arranged, preferably completely accommodated therein. This cavity allows further shielding of the radio-frequency radiation used for identification in other directions than required for identification, in particular if the endless profile is electrically conductive, for example made of a metal or a metal alloy.

According to a further embodiment, the radio-frequency reading device or radio-frequency writing/reading device extends transversely to the support rail element into the inner cavity of the support rail element. For this purpose, a suitably designed feedthrough for a housing of the radio-frequency reading device or radio-frequency writing/reading device is provided in a side wall of the support rail element.

According to a further aspect of the present invention, there is provided a chain conveyor for piece goods, said chain conveyor having a driven linked chain, in particular an endlessly circulating linked chain made of a plastic, said chain conveyor comprising at least one radio-frequency identification arrangement as described above. According to the present invention, the chain conveyor comprises a support rail for guiding and supporting the linked chain which is connected to the support rail element of the respective radio-frequency identification arrangement. In particular, the support rail element of the respective radio-frequency identification arrangement may be formed by a profile identical to that of the support rail of the chain conveyor.

According to a further embodiment, at least one workpiece carrier is provided on the linked chain, which comprises an RFID tag, wherein the RFID tag is disposed in a recess on the underside of the workpiece carrier and wherein the linked chain is guided in the support rail element of the radio-frequency identification arrangement in such a way that the radio-frequency reading device or radio-frequency writing/reading device and the RFID tag are aligned with each other, if viewed in a cross-section, during the identification process when the radio-frequency radiation is emitted toward the RFID tag and/or reflected back or reflected by the RFID tag. In this way, a minimum distance can be ensured between the radio-frequency reading device or radio-frequency writing/reading device and the RFID tag.

According to a further embodiment, the workpiece carrier, is formed rotationally symmetrical, if viewed in a top view, for which purpose the workpiece carrier is conveniently guided centrally in the support rail element and the RFID tag is conveniently positioned at a central position on the workpiece carrier.

In order to effectively transfer forces which, occur in a congestion situation in the chain conveyor, according to a further embodiment, the workpiece carrier is designed as a so-called 'puck' having a cylindrical base and a ring mounted thereon so as to be rotatable or non-rotatable and so that a rotation of the ring or puck is possible at all positions in the chain conveyor without the requirement of absorbing the forces from other pucks.

According to a further embodiment, the workpiece carrier furthermore comprises at least one sensor for the non-contact determination of the positioning of the workpiece carrier on the linked chain and relative to the support rail element, namely by means of a sensor ring made of metal which is integrated circumferentially into the surface shell of the workpiece carrier. The detection of this sensor ring and thus of the workpiece carrier is effected by means of an inductive detector. Thus, in particular, also in any desired rotational position of the workpiece carrier a detection may be accomplished reliably.

A further aspect of the present invention relates to the use of a radio-frequency identification arrangement as described above or of a chain conveyor for piece goods comprising at least one such radio-frequency identification arrangement as described above for the identification of workpieces or workpiece carriers conveyed by a chain conveyor.

OVERVIEW ON DRAWINGS

The invention will now be described by way of example and with reference to the appended drawings, from which further features, advantages and problems to be solved will become apparent. In the drawings:

FIGS. 2a to 2d show a radio-frequency identification arrangement for a chain conveyor for piece goods according to the present invention;

FIG. 3a is a plan view of a radio-frequency identification arrangement according to a further embodiment according to the present invention.

In the drawings, like reference numerals designate identical or substantially equivalent elements or groups of elements.

DETAILED DESCRIPTION OF PREFERRED EMBODIMENTS

Figure 1:
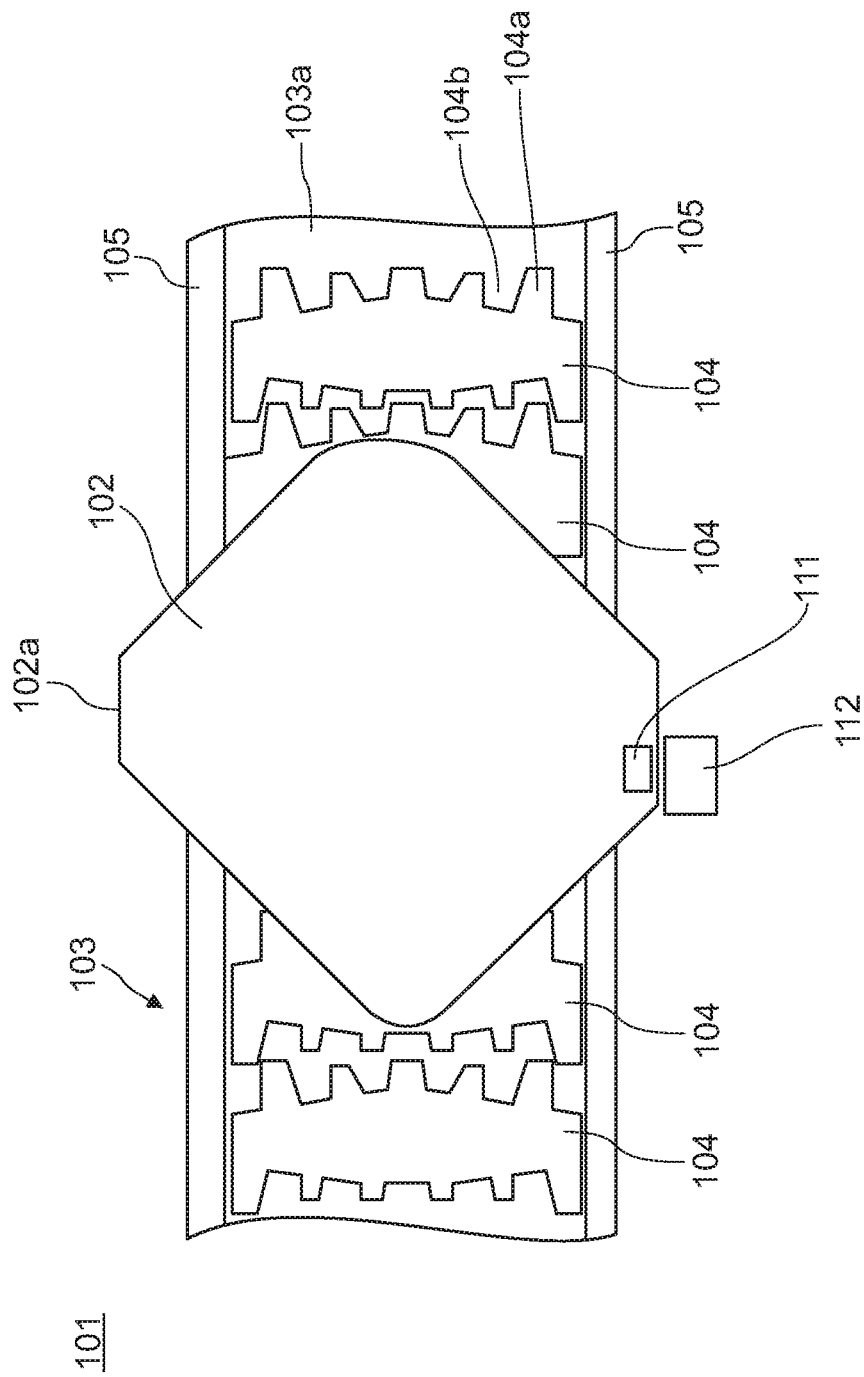
FIG. 1 is a schematic plan view of a detail of a chain conveyor comprising a radio-frequency identification arrangement according to the prior art.
Figure 2B:
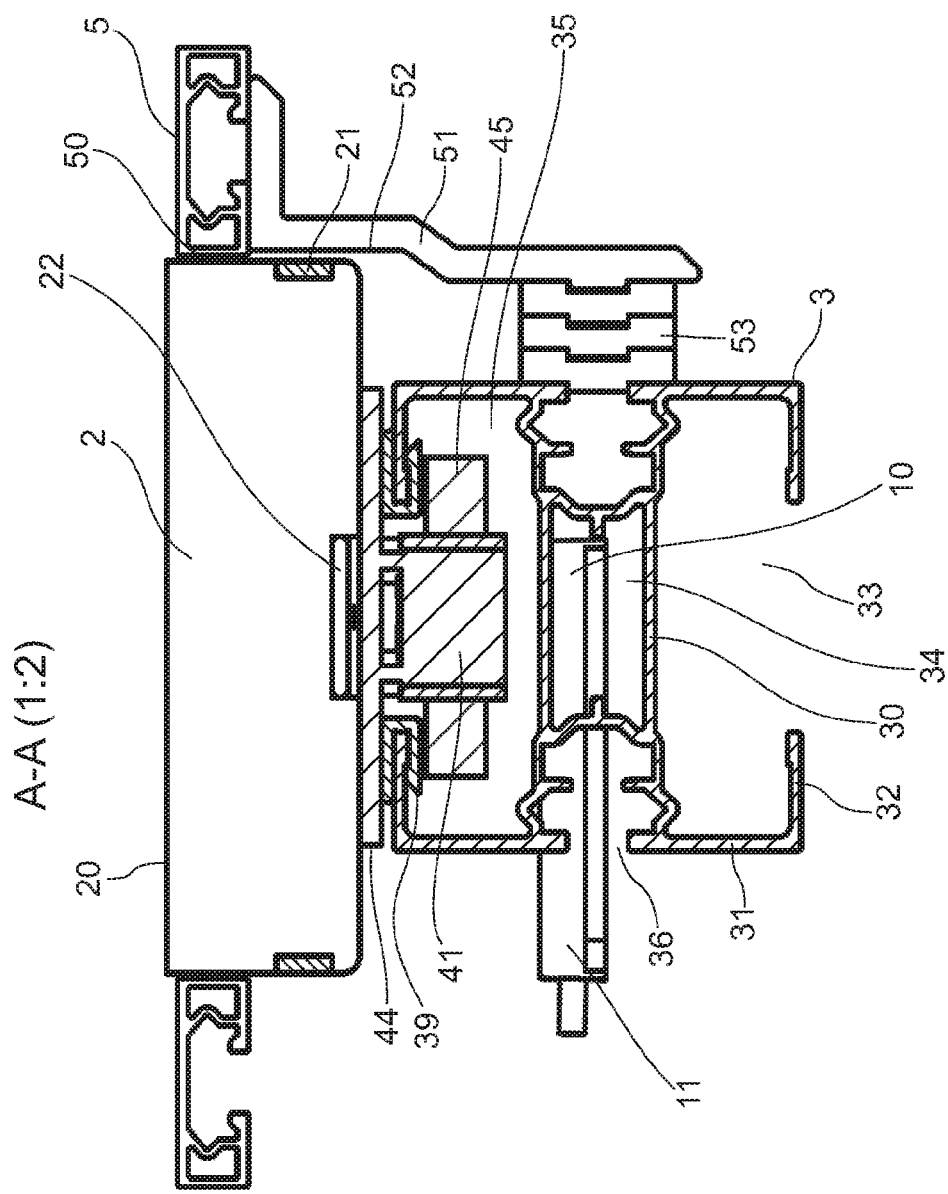

FIGS. 2a to 2d show, in a top view, in a cross-section along A-A of FIG. 2a, in a further cross-section as well as in a side view a radio-frequency identification arrangement for a chain conveyor for piece goods according to the present invention. The radio-frequency identification arrangement according to FIGS. 2a and 2b comprises a support rail element 3, a linked chain 4 guided and supported axially movably therein and two lateral guidings 5, which are disposed laterally above the support rail element 3 and extend in parallel with the conveying direction, for guiding the linked chain by means of lateral surfaces 50. The support rail element 3 is formed as an endless profile of a metal or of a metal alloy, which is preferably designed identically to the profile of the support rail of a chain conveyor (not shown), in which a linked chain 4 is endlessly circulating and repeatedly deflected.

For this purpose, the linked chain 4 comprises a plurality of chain links 40, which are coupled to each other, each of which consists of a T-shaped base body 41, at the upper end of which a supporting surface 44 is provided, for supporting the piece of goods to be conveyed, particularly a workpiece or a workpiece carrier. The supporting surface 44 has a plurality of teeth 42 and gaps 43 formed between them, each of which is formed along an arcuate line, with the end faces of the teeth 42 each being aligned along a line vertical on the lateral guiding 5. Two transverse bolts 45 protrude perpendicularly from the lower end of the T-shaped base body 41.

The support rail element 3 is formed as a symmetrical double profile having a rectangular upper space 35 and a rectangular lower space 33, each of which is formed by two connecting webs 31 extending perpendicularly from the bottom 30 and by two transverse webs 32 extending perpendicularly, inwardly and in parallel with the bottom 30 of the connecting webs 31. A gap is formed between the two transverse webs 32 of the two spaces 33, 35, which extends in the conveying direction of the linked chain 4.

In the upper space 35 thus formed, the linked chain 4 is positively guided. For this purpose, the supporting surfaces 44 and transverse bolts 45 each encompass the transverse webs 32 of the support rail element 3. To reduce the friction between the linked chain 4 and the support rail element 3, U-shaped slide rail profiles 39 are clipped on the front ends of the transverse webs 32, which have a suitably low friction pairing with the material of the linked chain 4. In this way, the base bodies 41 of the linked chain are guided laterally in the gap between the transverse webs 32. The transverse bolts 45 prevent the linked chain from being lifted off the support rail element 3 and off the support rail of the chain conveyor (not shown), for example in the case of a vertical deflection of the linked chain 4.

The lower space 33 of the support rail element 3 and the support rail of the chain conveyor may be used in a corresponding manner for guiding a lower run of an endlessly guided linked chain, but in general it is not essential.

Furthermore, for lateral guidance of the workpiece carrier 2, two lateral guidings 5 are disposed laterally above the support rail element 3. The lateral guidings 5 are mounted on substantially L-shaped connecting webs 51, which are connected to the support rail element 3 via horizontal connecting webs 53. It can be seen in FIGS. 2b and 2c how the workpiece carrier 2 is further guided laterally by the vertical guiding surfaces 52 of the connecting webs 51.

A rectangular inner cavity 34 is formed between the upper space 35 and the lower space 33 which is enclosed by the two bottoms 30 of the two spaces 33, 35 as well as by inner side walls of the support rail element 3. The housing 11 is inserted into this inner cavity 34 from the outside of the support rail element 3, at the front end of which a radio-frequency reading device or radio-frequency writing/reading device 10 is disposed for identification by means of radio-frequency radiation. According to FIG. 2b, the radio-frequency reading device or radio-frequency writing/reading device 10 and the base body 41 of the linked chain 4 are disposed in the center of the support rail element 3, if viewed in a cross-section. The inner cavity 34 effectively shields the radio-frequency radiation in directions other than that required for identification by means of the radio-frequency radiation.

In order that the radio-frequency radiation can be radiated unhindered towards the workpiece and be received by the workpiece, either an opening is provided in the bottom 30 of the support rail element 3 in the region of the radio-frequency reading device or radio-frequency writing/reading device, as indicated by reference numeral 37 in FIG. 3, or the material of the support rail element 3 is either made weaker or replaced by a cover which is transparent to the radio-frequency radiation used, for example by a plastic film.

On the linked chain 4, a workpiece carrier 2 is supported which, in the illustrated embodiment, is formed, for example, as a puck comprising a cylindrical base and a ring mounted thereon so as to be rotatable or non-rotatable. An RFID tag 22 is provided in a recess on the underside of the workpiece carrier 2 and serves to identify the workpiece carried by the workpiece carrier 2 in a known manner. For this purpose, the RFID tag 22 comprises an antenna, an analog circuit for receiving and transmitting radio-frequency signals, a digital circuit and a permanent memory, which may also be configured for multiple writing. When the workpiece carrier 2 is moved past the radio-frequency reading device or radio-frequency writing/reading device 10 according to FIG. 2b, the RFID tag 22 and the radio-frequency reading device or radio-frequency writing/reading device 10 are disposed in alignment with each other one above the other, if viewed in a cross-section. Here, the distance between the radio-frequency reading device or radio-frequency writing/reading device 10 and the RFID tag 22 substantially corresponds to the height of the upper space 35. Preferably, the distance between the radio-frequency reading device or radio-frequency writing/reading device 10 and the RFID tag 22 of the workpiece carrier 2 is in the range between 0.9 times to 1.5 times the height of the upper space 35, more preferably in the range between 0.9 times and 1.2 times the height of the upper space 35.

Figure 2C:
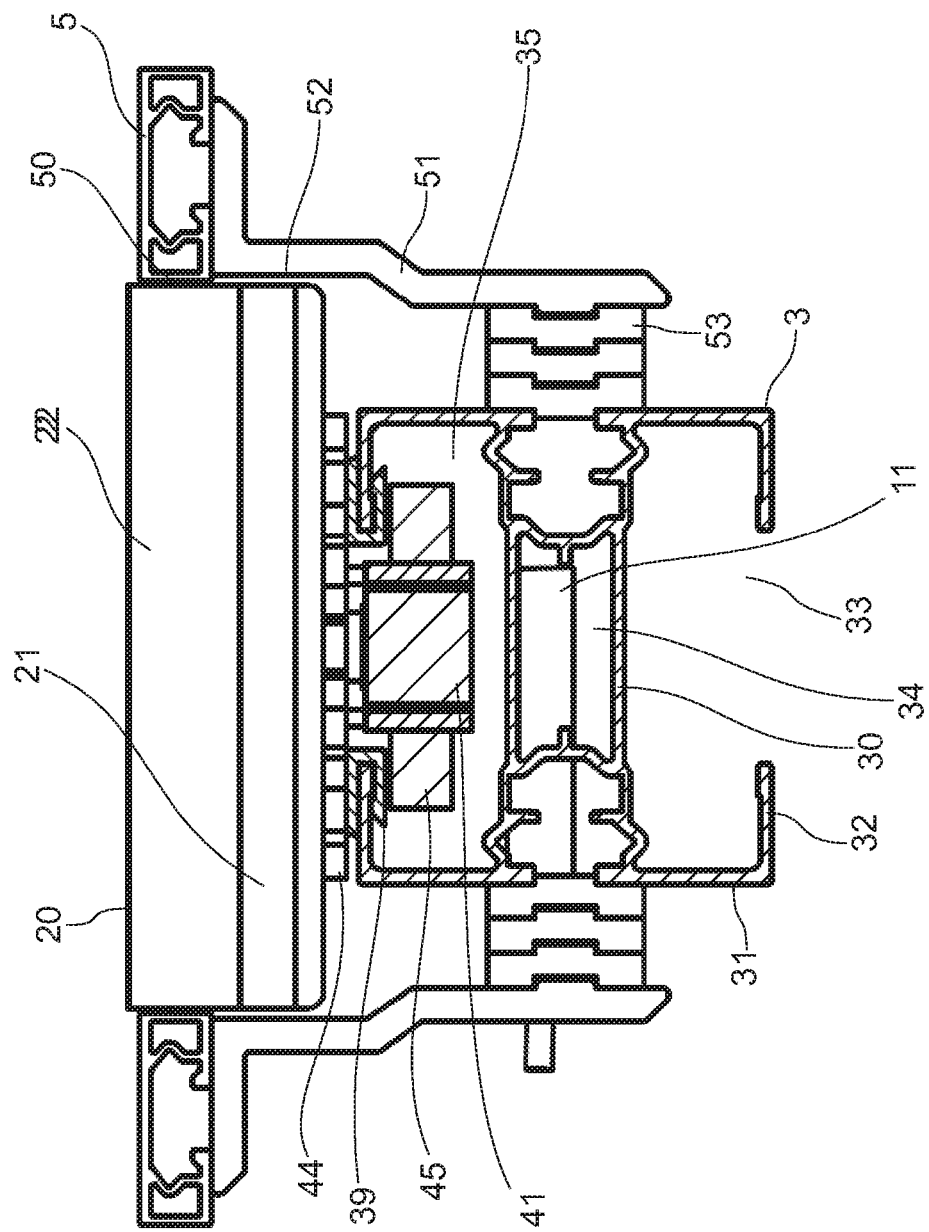

According to FIG. 2c, the workpiece carrier is of a rotationally symmetrical design, if viewed in cross-section, and a circumferential sensor ring 21 is disposed on the outer circumference of the workpiece carrier 21 in order to determine the position of the workpiece carrier 2 on the linked chain 4 relative to the support rail element 3 in a non-contact manner, in particular inductively or by means of radio-frequency radiation, which generally may also be emitted and/or detected by the radio-frequency reading device or by radio-frequency writing/reading device 10 of the support rail element 3.

Figure 2D:
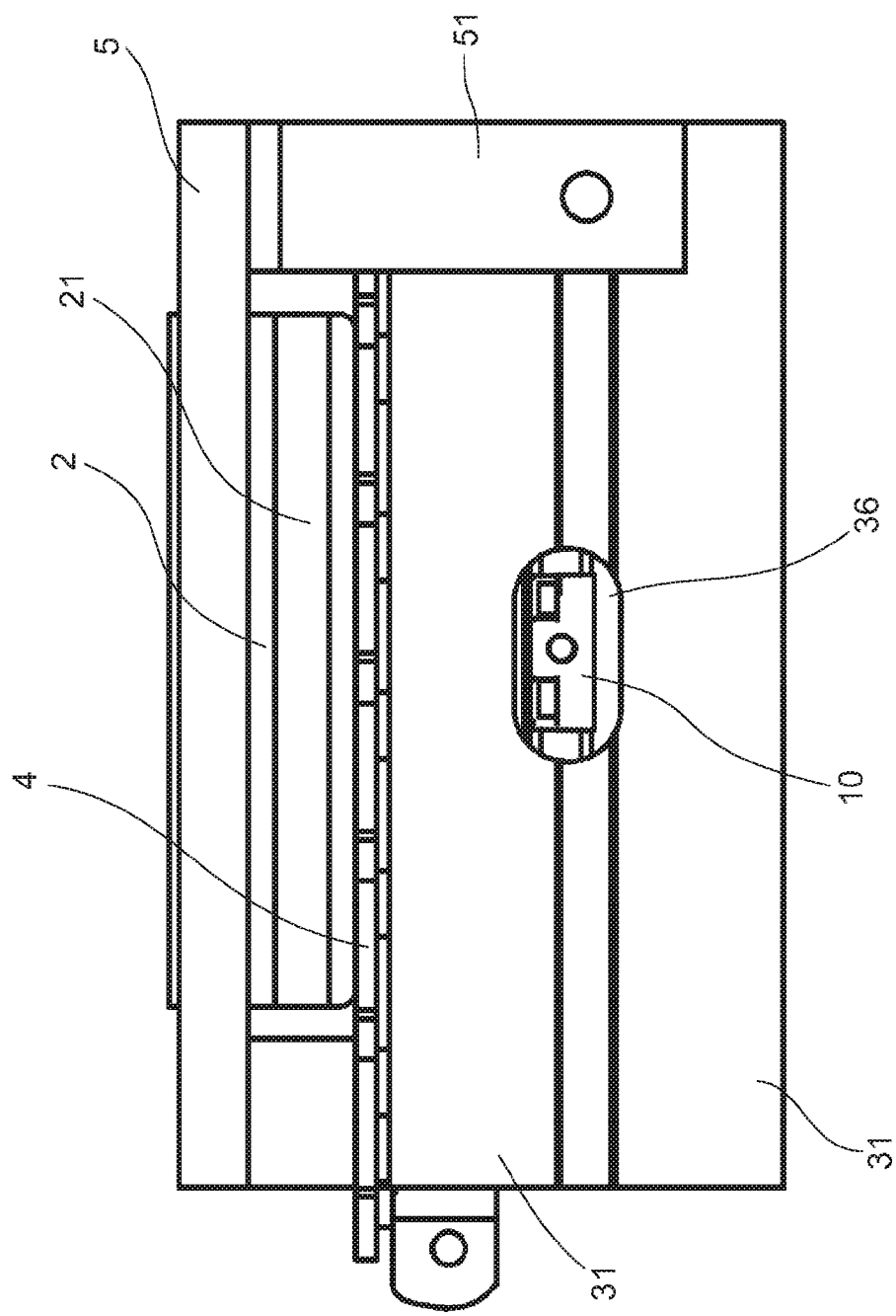

FIG. 2d shows the radio-frequency identification arrangement in a side view. It can be seen that the radio-frequency reading device or radio-frequency writing/reading device 10 projects into the free space 36 on the side face of the support rail element 3.

Figure 3B:
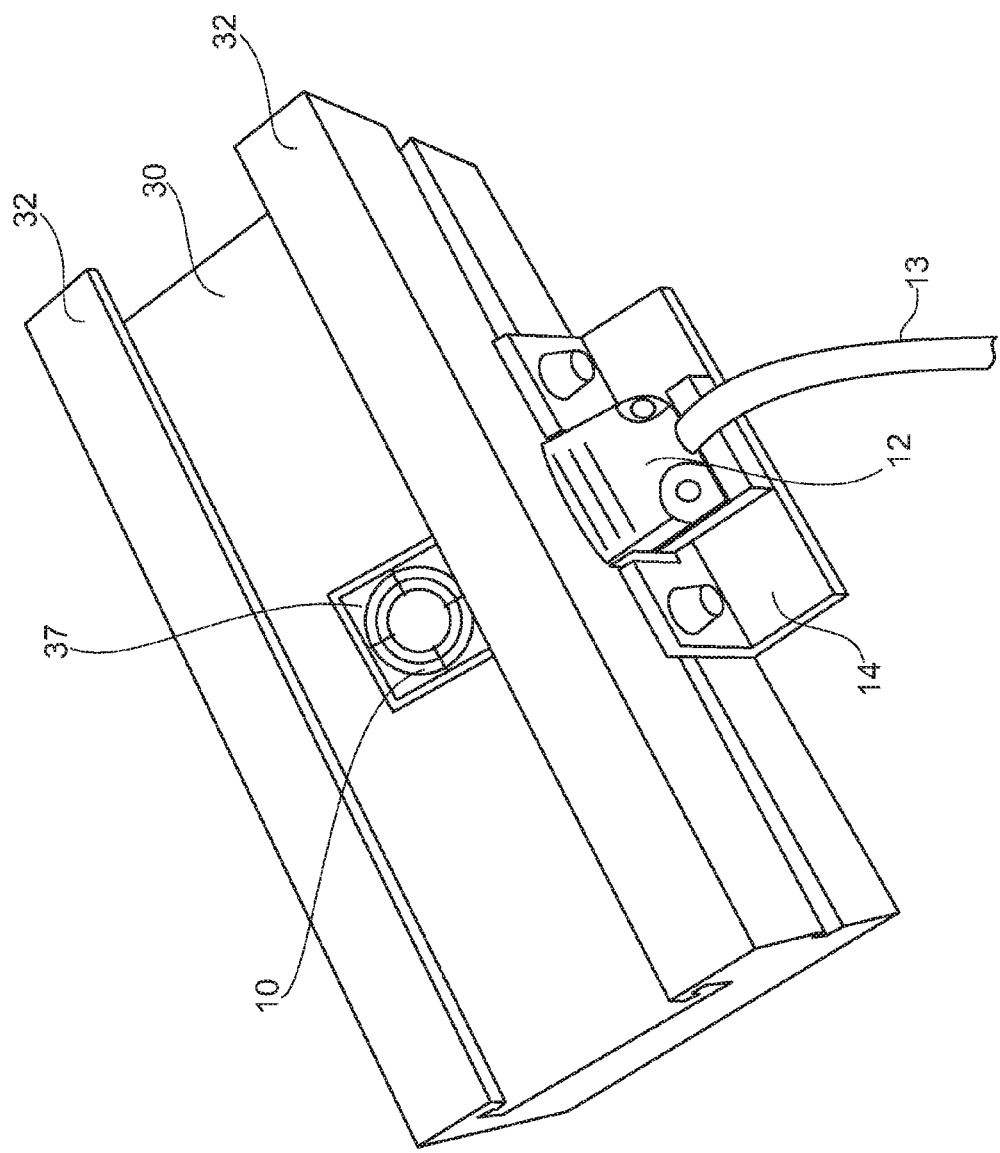
FIG. 3b shows the radio-frequency identification arrangement according to FIG. 3a in a perspective top view.

FIG. 3a shows a top view of a radio-frequency identification arrangement according to a further embodiment according to the present invention, whereas FIG. 3b shows this radio-frequency identification arrangement in a perspective top view. According to FIGS. 3a and 3b, an opening 37 is formed is formed in the bottom 30 of the support rail element, below which the radio-frequency reading device or radio-frequency writing/reading device 10 is arranged. On the side of the support rail element, an L-shaped mounting bracket 14 is provided, which serves to fix the connector 12 and the cable 13 and via which the radio-frequency reading device or radio-frequency writing/reading device 10 is controlled and read out.

For handling the workpiece carriers 2 and the workpieces held by them, the RFID tags 22 of the workpiece carriers 2 are read out by means of radio-frequency radiation in a known manner, and in this way the workpiece carriers 2 or the workpieces held by them are identified. In addition, the positioning of the workpiece carrier 2 relative to the support rail element 3 may also be determined for this purpose by means of the sensor ring 21. Based on the identification of the workpiece carrier 2 and thus of the workpiece held by it, the further handling is then controlled by a control device, in particular a microcontroller.

According to the present invention, the RFID tag can be read out and written through the linked chain at a low power of the radio-frequency radiation used. The radio-frequency identification arrangement described above can thereby be easily integrated into an existing chain conveyor by fitting the support rail element at a suitable location into the support rail of the chain conveyor. A further adjustment of the radio-frequency reading device or of the radio-frequency writing/reading device is not required in this case, because the radio-frequency reading device or radio-frequency writing/reading device is automatically arranged in a known alignment and orientation when the support rail element is mounted in the support rail of the chain conveyor. Thus, according to the present invention, also rotationally symmetrical workpiece carriers, pucks, auxiliary workpiece carriers or components may be read our and written on without an additional orientation on the linked chain of the chain conveyor.

LIST OF REFERENCE NUMBERS 1 chain conveyor
2 workpiece carrier
3 support rail element
4 linked chain
5 lateral guiding
10 RFID writing/reading device
11 housing of RFID writing/reading device 10
12 connector
13 electric cable
14 supporting bracket
20 supporting surface of workpiece carrier 2
21 sensor ring
22 RFID tag
30 bottom of support rail element 3
31 vertical connecting web
32 horizontal transverse web
33 lower space of support rail element 3
34 inner cavity of support rail element 3
35 upper space of support rail element 3
36 lateral clearance
37 opening
39 support rail attachment
40 chain link of linked chain 4
41 base body of linked chain 4
42 tooth
43 gap
44 supporting surface
45 bolt
50 guiding surface of lateral guiding 5
51 connecting web
52 guiding surface of connecting web 51
53 connecting web
100 chain conveyor
102 workpiece carrier
102a flattened side face
103 support rail
103a bottom of support rail
104 linked chain
104a tooth
104b gap
105 support rail as lateral guiding
111 RFID tag
112 RFID reading/writing device

The invention claimed is:

1. A radio-frequency identification arrangement for a chain conveyor for piece goods having a driven linked chain, comprising:
   a support rail element for guiding and supporting the driven linked chain in the region of the radio-frequency identification arrangement, and
   a radio-frequency reading device or radio-frequency writing/reading device for non-contact reading or reading/writing of information by means of a radio-frequency signal;
   wherein the support rail element comprises an upper space;
   an inner cavity is formed below a bottom of the upper space, in which the radio-frequency reading device or radio-frequency writing/reading device is arranged; and
   an opening is formed in the bottom of the upper space through which the radio-frequency signal is emitted directly to an underside of the driven linked chain and/or received therefrom.

2. The radio-frequency identification system as claimed in claim 1, wherein two connecting webs extend perpendicularly from the bottom of the support rail element, from which a respective transverse web extends perpendicularly, inwardly and in parallel with the bottom, and a gap is formed between the two transverse webs, so that the support rail element forms a space in which the driven linked chain is positively guided.

3. The radio-frequency identification system as claimed in claim 1, wherein the support rail element further comprises a lower space, wherein the inner cavity is formed between the bottom of the upper space and a bottom of the lower spaces.

4. The radio-frequency identification system as claimed in claim 3, wherein the radio-frequency reading device or radio-frequency writing/reading device extends transverse to the support rail element into the inner cavity.

5. The radio-frequency identification system as claimed in claim 1, wherein the driven linked chain consists of a plurality of chain links, each of which is formed by a base body which is T-shaped, if viewed in cross-section, wherein the T-shaped base body comprises a supporting surface for supporting the piece good or a piece good carrier at an upper end thereof and transverse bolts at a bottom end thereof, which are guided in the respective space of the support rail element.

6. A chain conveyor for piece goods comprising a driven linked chain and a support rail for guiding and supporting the driven linked chain, said chain conveyor comprising at least one radio-frequency identification arrangement, said at least one radio-frequency identification arrangement comprising:
- a support rail element for guiding and supporting the driven linked chain in the region of the radio-frequency identification arrangement, and
- a radio-frequency reading device or radio-frequency writing/reading device for non-contact reading or reading/writing of information by means of a radio-frequency signal; wherein
- the support rail element comprises an upper space;
- an inner cavity is formed below a bottom of the upper space, in which the radio-frequency reading device or radio-frequency writing/reading device is arranged; and
- an opening is formed in the bottom of the upper space through which the radio-frequency signal is emitted directly to the underside of the driven linked chain and/or received therefrom; wherein
- the support rail of the chain conveyor is connected to the support rail element of the at least one radio-frequency identification arrangement, and
- the radio-frequency reading device or radio-frequency writing/reading device is integrated into the chain conveyor by fitting the support rail element at a suitable location into the support rail of the chain conveyor.

7. The chain conveyor as claimed in claim 6, wherein at least one workpiece carrier is disposed on the driven linked chain, which has an RFID tag.

8. The chain conveyor as claimed in claim 7, wherein the RFID tag is disposed in a recess on the underside of the workpiece carrier, wherein the driven linked chain is guided in the support rail element of the radio-frequency identification arrangement in such a way that the radio-frequency reading device or radio-frequency writing/reading device and the RFID tag are arranged in alignment with each other, if viewed in cross-section.

9. The chain conveyor as claimed in claim 7, wherein the workpiece carrier is rotationally symmetrical, if viewed in a plan view.

10. The chain conveyor as claimed in claim 9, wherein the workpiece carrier is designed as a puck having a cylindrical base and a ring mounted thereon such that it can be rotated or cannot be rotated.

11. The chain conveyor as claimed in claim 7, wherein the workpiece carrier further comprises at least one sensor for the non-contact determination of the positioning of the workpiece carrier on the driven linked chain relative to the support rail element.

12. The chain conveyor as claimed in claim 7, wherein a distance between the radio-frequency reading device or radio-frequency writing/reading device and the RFID tag of the workpiece carrier essentially corresponds to the height of a space formed by the support rail element for guiding the driven linked chain.

13. The chain conveyor as claimed in claim 12, wherein the distance between the radio-frequency reading device or radio-frequency writing/reading device and the RFID tag of the workpiece carrier is in the range between 0.9 times and 1.5 times the height of the space formed by the support rail element.

14. The chain conveyor as claimed in claim 6, further comprising at least one lateral guiding which is disposed laterally above the support rail and/or the guide rail for guiding the workpiece carrier on the driven linked chain.

15. The chain conveyor as claimed in claim 6, wherein
- the support rail element of the at least one radio-frequency identification arrangement further comprises two connecting webs extending perpendicularly from the bottom of the support rail element of the at least one radio-frequency identification arrangement, a respective transverse web extending perpendicularly, inwardly and in parallel with the bottom, and
- a gap is formed between the two transverse webs of the support rail element of the at least one radio-frequency identification arrangement, so that the support rail element forms a space in which the driven linked chain is positively guided.

16. The chain conveyor as claimed in claim 6, wherein the support rail element of the at least one radio-frequency identification arrangement further comprises a lower space, wherein the inner cavity is formed between the bottom of the upper space and a bottom of the lower space.

17. The chain conveyor as claimed in claim 16, wherein the radio-frequency reading device or radio-frequency writing/reading device of the at least one radio-frequency identification arrangement extends transverse to the support rail element into the inner cavity.

18. The chain conveyor as claimed in claim 6,
- wherein the driven linked chain consists of a plurality of chain links, each of which is formed by a base body which is T-shaped, if viewed in cross-section,
- wherein the T-shaped base body comprises a supporting surface for supporting the piece good or a piece good carrier at an upper end thereof and transverse bolts at a bottom end thereof, which are guided in the respective space of the support rail element.

* * * * *